(12) United States Patent
Au

(10) Patent No.: US 10,644,810 B2
(45) Date of Patent: *May 5, 2020

(54) CONVERSION OF RF SIGNALS TO OPTICAL SIGNALS FOR PASSAGE THROUGH IMPAIRMENT MEDIUMS IN A WIRELESS COMMUNICATION NETWORK

(71) Applicant: T-Mobile USA, Inc., Bellevue, WA (US)

(72) Inventor: Chad Au, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/368,474

(22) Filed: Mar. 28, 2019

(65) Prior Publication Data

US 2019/0305856 A1 Oct. 3, 2019

Related U.S. Application Data

(63) Continuation of application No. 15/944,556, filed on Apr. 3, 2018, now Pat. No. 10,277,331.

(51) Int. Cl.
*H04B 10/114* (2013.01)
*H04B 10/90* (2013.01)
(Continued)

(52) U.S. Cl.
CPC ......... *H04B 10/90* (2013.01); *H04B 10/1143* (2013.01); *H04B 10/25753* (2013.01); *H04B 10/504* (2013.01); *H04B 2210/006* (2013.01)

(58) Field of Classification Search
CPC .................................................. H04B 10/90; H04B 10/25753; H04B 10/504; H04B 2210/006; H04B 10/1143
(Continued)

(56) References Cited

U.S. PATENT DOCUMENTS 5,159,479 A * 10/1992 Takagi ..................... H04B 7/00
                                                                      398/115
6,337,754 B1 * 1/2002 Imajo ............... H04B 10/25752
                                                                      398/115
(Continued)

FOREIGN PATENT DOCUMENTS

JP        2007259179 A  * 10/2007
JP        2007259179 A    10/2007

OTHER PUBLICATIONS

Office Action for U.S. Appl. No. 15/944,556, dated Sep. 26, 2018, Au, "Conversion of RF Signals to Optical Signals for Passage Through Impairment Mediums in a Wireless Communication Network", 16 pages.

*Primary Examiner* — Dalzid E Singh
(74) *Attorney, Agent, or Firm* — Lee & Hayes, P.C.

(57) ABSTRACT

An apparatus and method of propagating wireless signals through an impairment medium using a penetrator device within a wireless communication network is discussed herein. The apparatus and method includes transmitting a first radio frequency (RF) signal from a first point within the wireless communication network and receiving the first RF signal at a first unit of the penetrator device. The method further includes converting, by the first unit of the penetrator device, the RF signal into an optical signal and transmitting the optical signal from the first unit of the penetrator device to a second unit of the penetrator device through the impairment medium. The method also includes converting, by the second unit of the penetrator device, the optical signal into a second RF signal and transmitting, by the second unit of the penetrator device, the second RF signal to a second point within the wireless communication network.

20 Claims, 8 Drawing Sheets

(51) Int. Cl.
*H04B 10/2575* (2013.01)
*H04B 10/50* (2013.01)

(58) Field of Classification Search
USPC .......................................... 398/115
See application file for complete search history.

(56) References Cited

U.S. PATENT DOCUMENTS

| | | | | |
|---|---|---|---|---|
| 6,980,739 | B1* | 12/2005 | Hong | H04B 10/25759 398/158 |
| 10,277,331 | B1* | 4/2019 | Au | H04B 10/90 |
| 2002/0140520 | A1* | 10/2002 | Hikita | H03H 9/0028 333/133 |
| 2008/0267112 | A1* | 10/2008 | Lucidarme | H04B 5/02 370/315 |
| 2014/0170966 | A1* | 6/2014 | Nilsson | H04B 5/0018 455/14 |
| 2014/0237917 | A1* | 8/2014 | Theios | C03C 17/366 52/203 |
| 2016/0006615 | A1* | 1/2016 | Laraqui | H04B 10/25758 398/49 |
| 2016/0098167 | A1* | 4/2016 | Shah | G06F 3/0488 345/173 |
| 2016/0135184 | A1* | 5/2016 | Zavadsky | H04B 7/04 370/329 |

* cited by examiner

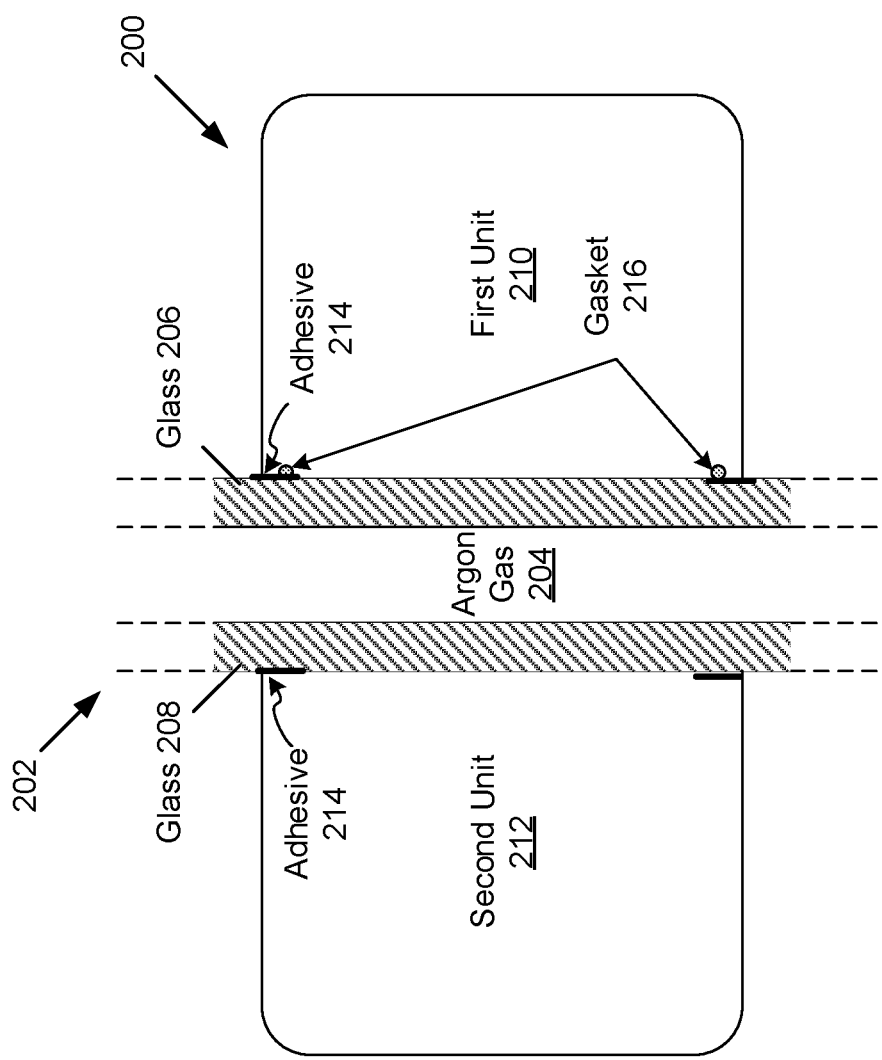

CONVERSION OF RF SIGNALS TO OPTICAL SIGNALS FOR PASSAGE THROUGH IMPAIRMENT MEDIUMS IN A WIRELESS COMMUNICATION NETWORK

CROSS REFERENCE TO RELATED APPLICATIONS

The present disclosure is a continuation of, and claims priority under 35 U.S.C. § 120 to, U.S. patent application Ser. No. 15/944,556, filed Apr. 3, 2018, the entire disclosure of which is hereby incorporated by reference in its entirety.

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as Internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

Wireless communication networks generally operate by transmitting and distributing radio frequency (RF) signals to their customers, e.g., users of mobile telecommunication devices. Thus, operators of wireless communication networks need to be able to distribute the operating RF signals such that the RF signals can reach their customers, e.g., users, wherever they may be. For example, RF signals need to be able to reach a user's mobile telecommunication device in the user's cars, on streets, in the user's home, at work, etc. In providing coverage to customers at home and in the workplace, it is generally known that indoor coverage may be difficult due to signal path loss through the buildings themselves. For example, one specific impairment involves certain types of thermal coated low emissivity (Low-e) glass used for insulated windows. Such glass has been found to significantly prevent RF signals from passing through the glass, regardless of the frequency of the RF signals.

One previous attempt to improve transmission of RF signals into buildings includes the use of repeaters. In such an arrangement, repeaters have been proposed to capture outdoor RF signals and retransmit an amplified version of the RF signals indoors and vice versa. However, such an arrangement may be costly and time consuming in that such an arrangement requires a technician with technical skills that are above and beyond the skills of a typical consumer to effectively install a repeater system, which may make the solution impractical from a business perspective.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 2A and 2B schematically illustrate a penetrator device including first and second units mounted on opposite sides of a thermal pane window in the wireless communication network of FIG. 1, in accordance with various configurations.

DETAILED DESCRIPTION

Figure 1:
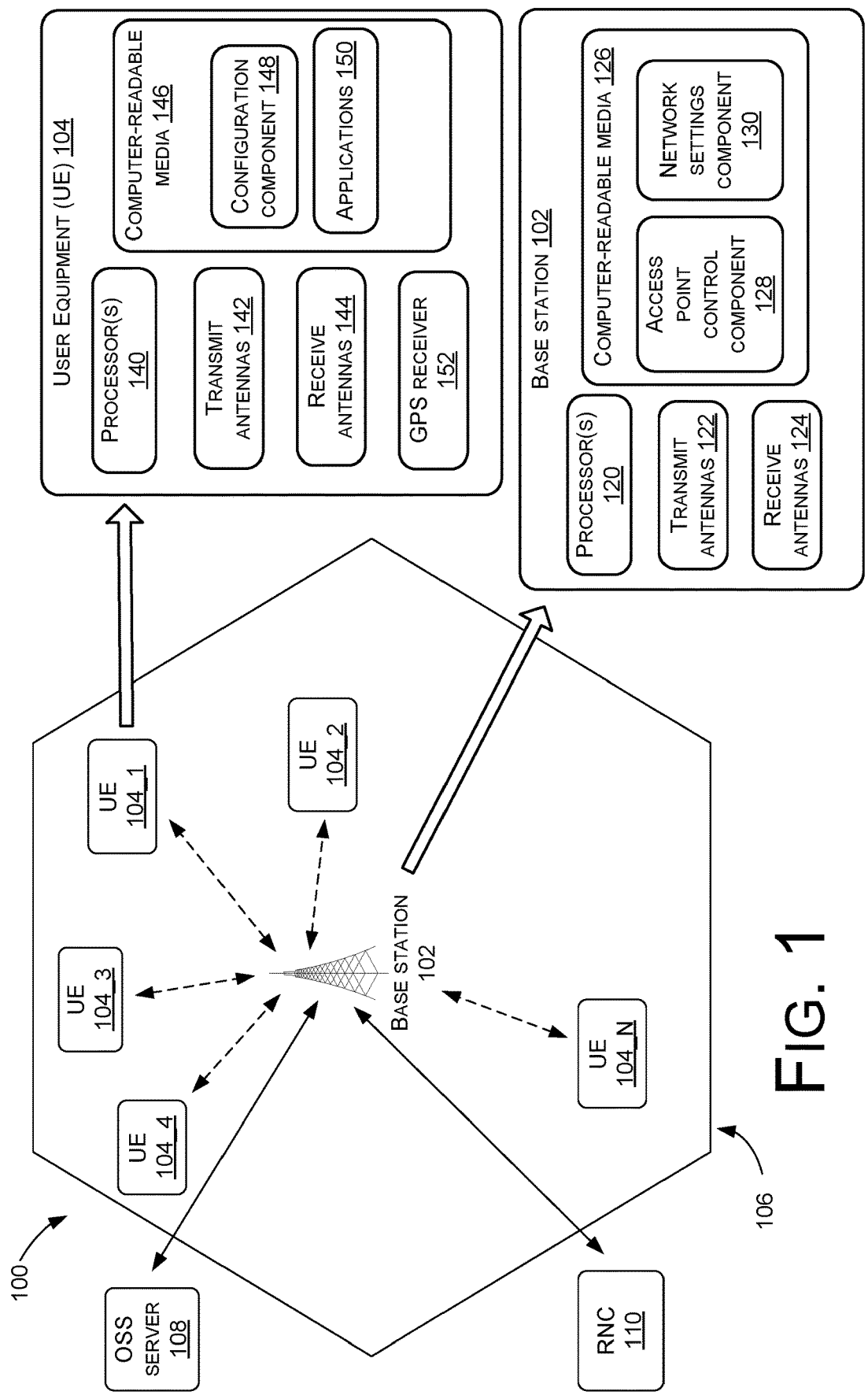
FIG. 1 schematically illustrates a wireless communication network, in accordance with various configurations.

Described herein is a wireless communication network and mobile devices for use in the wireless communication network that include techniques and architecture for propagating wireless signals within a wireless communication network by exploiting the optical quality of glass, especially thermal coated low emissivity (Low-e) glass, to provide a path for the information content of RF signals to pass through the glass. In general, the techniques and architecture provide an apparatus that includes, on both sides of glass panes of a window, one or more antennas, a receiver, a modulator, an RF source, and in some configurations, an amplifier.

In a configuration, a RF signal may be broadcast from a base station, an access point, etc., within a wireless communication network. The RF signal may be received by a first unit of a penetrator device on a first side of a window, e.g., a thermal pane window, of a structure. The received RF signal may then be converted to an optical signal that is transmitted through the window. On the other side of the window, a second unit of the penetrator device receives the optical signal and converts the optical signal back into a RF signal. The RF signal may then be broadcast to a user device, e.g., a mobile device, within the structure.

In configurations, the user device may transmit signals within the structure that are received by the second unit of the penetrator device. The penetrator device may then convert the RF signal into an optical signal and transmit the optical signal through the window. The first unit of the penetrator device then receives the optical signal and converts the optical signal back into a RF signal that may then be transmitted from the first unit of the penetrator device to a base station, an access point, etc. of the wireless communication network In particular, an outdoor modulated RF signal impinges on an antenna of the first unit of the penetrator device. The modulated RF signal is fed into a RF receiver that converts the data payload of the RF signal into a modulating current, which directly modulates an optical signal source. In configurations, the optical signal source comprises a laser diode. The laser diode then produces a modulated laser signal that traverses the glass pane(s) of the window with relatively low loss as the window generally is optically transparent. On the other side of the glass pane(s), an optical receiver receives the modulated laser signal at a second unit of the penetrator device. The second unit of the penetrator device reverses the process by modulating a RF signal source that transmits a RF signal of the same frequency band. The RF signal may then be amplified and transmitted indoors within the structure through an antenna of the second unit of the penetrator device.

The same process may be reversed and used for an indoor user using a mobile device to produce a signal to reach an outdoor base station or access point of the wireless communication network. An indoor modulated RF signal impinges on the antenna of the second unit of the penetrator device. The modulated RF signal is fed into a RF receiver of the second unit that converts the data payload of the RF signal into a modulating current, which directly modulates an optical signal source of the second unit. In configurations, the optical signal source comprises a laser diode. The laser diode then produces a modulated laser signal that traverses the glass pane(s) of the window with relatively low loss as the window generally is optically transparent. On the other side of the glass pane(s), an optical receiver of the first unit of the penetrator device receives the modulated laser signal. The first unit of the penetrator device reverses the process by modulating a RF signal source of the first unit with a modulating current from the optical receiver. The RF signal source transmits a RF signal of the same frequency band. The RF signal may then be amplified and transmitted out of the structure through the antenna of the first unit of the penetrator device.

FIG. 1 illustrates a wireless communication network 100 (also referred to herein as network 100). The network 100 comprises a base station (BS) 102 communicatively coupled to a plurality of user devices or user equipment, referred to as user equipment (UE) 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and thus, the wireless communication network 100 may be divided into four regional subnetworks, where each regional subnetwork includes multiple macro cells 106 that may be divided into small cells.

In an embodiment, the UEs 104_1, . . . , 104_N may comprise any appropriate devices, e.g., portable electronic devices, for communicating over a wireless communication network. Such devices include mobile telephones, cellular telephones, mobile computers, Personal Digital Assistants (PDAs), radio frequency devices, handheld computers, laptop computers, tablet computers, wearables (e.g. watches, fitness trackers, VR and AR glasses, intelligent personal assistants (e.g. AMAZON™ ECHO™), palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N using RF signals. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an operation support subsystem (OSS) server 108, a radio network controller (RNC) 110, and/or the like. The RNC 110 can also be in the form of a mobility management entity that serves as a gateway when the wireless communication network 100 operates according to the LTE standard or LTE Advanced standard.

In an embodiment, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some embodiments, the processor(s) 120 are a central processing unit (CPU), a graphics processing unit (GPU), or both CPU and GPU, or any other sort of processing unit. The base station 102 can also be in the form of, for example, a Node B (where the wireless communication network 100 is 3G UMTS network), in the form of an eNodeB (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver component of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disc read-only memory ("CD-ROM"), digital versatile discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store components, such as instructions, data stores, and so forth that are configured to execute on the processor(s) 120. For instance, the computer-readable media 126 may store an access point control component 128 and a network settings component 130, as will be discussed in more detail herein later.

Although FIG. 1 illustrates the computer-readable media 126 in the BS 102 storing the access point control component 128 and the network settings component 130, in various other embodiments, the access point control component 128, the network settings component 130, and one or more other components (not illustrated, may be stored in another component of the network 100 (e.g., other than the BS 102). For example, one or more of these components may be stored in a computer-readable media included in the OSS server 108, the RNC 110, another appropriate server associated with the network 100, and/or the like.

Although not illustrated in FIG. 1, various other components (e.g., an operating system component, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some embodiments, the processor(s) 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several components, such as instructions, data stores, and so forth that are configured to execute on the processor(s) 140. For instance, the computer-readable media 146 may store a configuration component 148. In configurations, the computer-readable media 146 may also store one or more applications 150 configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.). The applications 150 may also include third-party applications that provide additional functionality to the UE 104. In configurations, the UE 104 may also comprise a Global Positioning System (GPS) receiver 152 and/or another location determination component.

Although not illustrated in FIG. 1, the UEs 104 may also comprise various other components, e.g., a battery, a charging unit, one or more network interfaces, an audio interface, a display, a keypad or keyboard, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration component.

In an embodiment, the network settings component 130 stored in the computer-readable media 126 maintains a plurality of network settings associated with the network 100. Individual network settings maintained by the network settings component 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings component 130 may also include any other appropriate type of network settings.

In an embodiment, one or more of the plurality of network settings maintained by the network settings component 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration components 148) may configure themselves and communicate with the BS 102 accordingly.

As previously noted, in providing coverage to UEs 104 at home, in the workplace and other structures, it is generally known that indoor coverage may be difficult due to signal path loss through the buildings themselves. For example, one specific impairment involves certain types of thermal coated "low-E" glass use for insulated windows. Such glass has been found to significantly prevent RF signals from passing through, regardless of the frequency of the RF signals.

FIG. 2A schematically illustrates a penetrator device 200 mounted on opposite sides of a thermal pane window 202 in the wireless communication network 100. In configurations, the thermal pane window 202 includes a gas 204, such as, for example, argon gas, between two panes of glass, 206, 208. Additionally, in a configuration, at least one of panes 206, 208 may include a thermal coating on an interior surface of the pane.

In FIG. 2A, a first unit 210 and a second unit 212 of the penetrator device 200 are affixed to opposite sides, e.g., planes of glass 206, 208, of the thermal pane window 202 using an adhesive 214. In a configuration, the first unit 210 is located on an outdoor side of the thermal pane window 202 and the second unit is located on an indoor side of the thermal pane window 202, e.g., within a structure that includes the thermal pane window 202. A gasket 216 may be provided to seal the interior of the units 210, 212 to protect the electronics contained therein from precipitation, dust, moisture, etc. In a configuration, only the first unit 210 includes a gasket 216 as only the first unit 210 is located outdoors and thus, may need protection from the elements. In configurations, the gasket 216 may comprise a rubber O-ring or something similar.

Figure 2B:
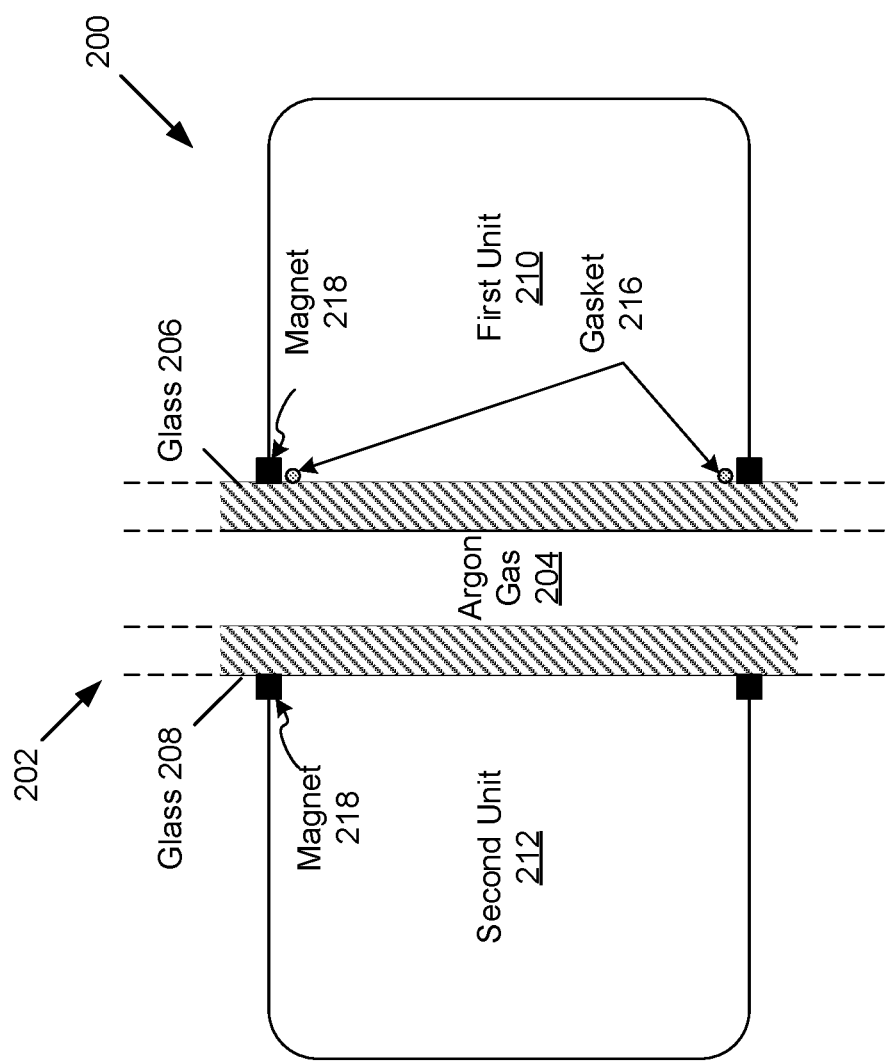

FIG. 2B illustrates the first and second units 210, 212 of the penetrator device 200 coupled on opposite sides of the thermal pane window 202 utilizing magnets 218. The magnets 218 may be utilized to affix the first and second units 210, 212 to metallic window panes (not illustrated) included with the window 202 or surrounding the window 202.

Figure 3A:
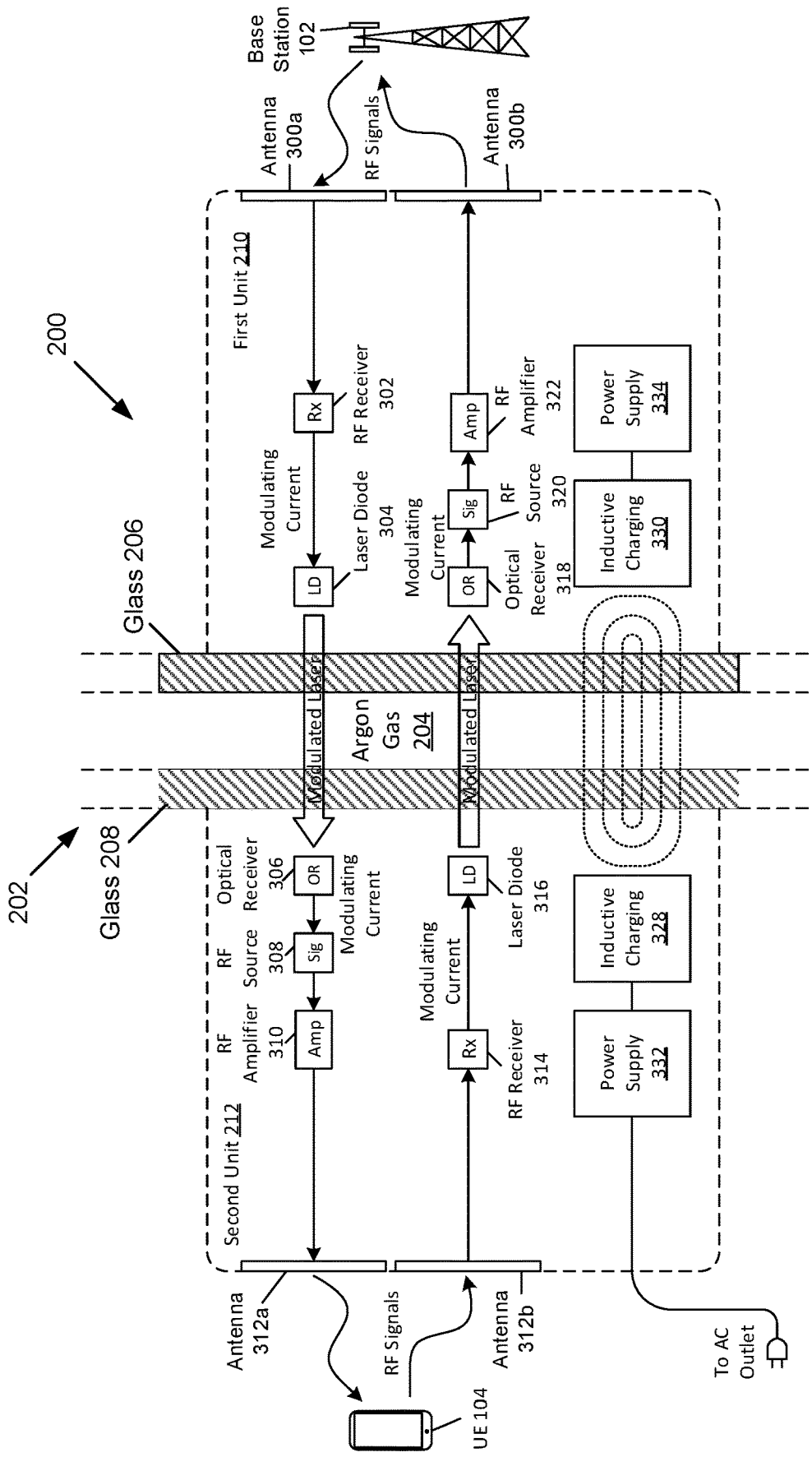
FIGS. 3A and 3B schematically illustrate examples of electronic components that may be included in the first and second units of the penetrator device, of the penetrator device of FIGS. 2A and 2B, in accordance with various configurations.

FIG. 3A schematically illustrates examples of electronic components that may be included in the first unit 210 and the second unit 212 of the penetrator device 200. The first unit 210 may include an antenna 300 that is coupled to a RF receiver 302. The antenna 300a may receive a modulated RF signal from a base station 102 (or an access point) of the wireless communication network 100. An optical signal source 304 is coupled to the RF receiver 302. In a configuration, the optical signal source 304 comprises a laser diode. The RF receiver 302 receives a RF signal from the antenna 300 and provides a modulating current that is supplied to the laser diode 304. The RF receiver 302 converts the data payload of the RF signal into the modulating current, which directly modulates the laser diode 304.

The laser diode 304 provides a modulated laser signal that is transmitted through the glass panes 206 and gas 204 of the thermal pane window 202. The second unit 212 includes an optical receiver 306 to receive modulated laser signals, which provides a modulating current to a RF signal source 308 to convert the modulated laser signal back into a modulated RF signal. The RF signal source 308 may be coupled to an amplifier 310 in configurations, if desired, to amplify the RF signal. In configurations, the RF amplifier 310 may be a part of a RF transmitter (not illustrated) that transmits the RF signal via an antenna 312a. The antenna 312a may provide the RF signal to a UE 104.

As can be seen in FIG. 3A, a RF signal may be provided from the UE 104 to an antenna 312b of the second unit 212 to provide the RF signal to the outdoor base station 102 (or an access point) of the wireless communication network 100. An indoor modulated RF signal impinges on the antenna 312b of the second unit of the penetrator device 200. The modulated RF signal is fed into a RF receiver 314 of the second unit 212 that converts the data payload of the RF signal into a modulating current, which directly modulates an optical signal source 316 of the second unit 212. In a configuration, the optical signal source 316 comprises a laser diode.

The laser diode 316 produces a modulated laser signal that traverses the glass panes 206, 208 and gas 204 of the window 202. On the other side of the window 202, an optical receiver 318 of the first unit 210 receives the modulated laser signal and converts the data payload of the RF signal into a modulating current. The optical receiver 318 modulates a RF signal source 320 of the first unit 210 with the modulating current. The RF signal source transmits a RF signal of the same frequency band. The RF signal may be amplified by an amplifier 322 if desired and transmitted out of the penetrator device 200 via an antenna 300b of the first unit 210. In configurations, the RF amplifier 322 may be a part of a RF transmitter (not illustrated) that transmits the RF signal via the antenna 300b. The antenna 300b may provide the RF signal to the base station 102 (or an access point) of the wireless communication network 100.

An advantage of using a modulating current to directly modulate the laser diodes 304, 316 and the RF signal sources 308, 320 is that use of the modulating current is generally technology standard neutral. Thus, no matter if the wireless technology protocol of the wireless communication network is legacy GSM, UMTS, LTE, 5G, etc., the penetrator device 200 may still support the wireless technology protocol.

Figure 3B:
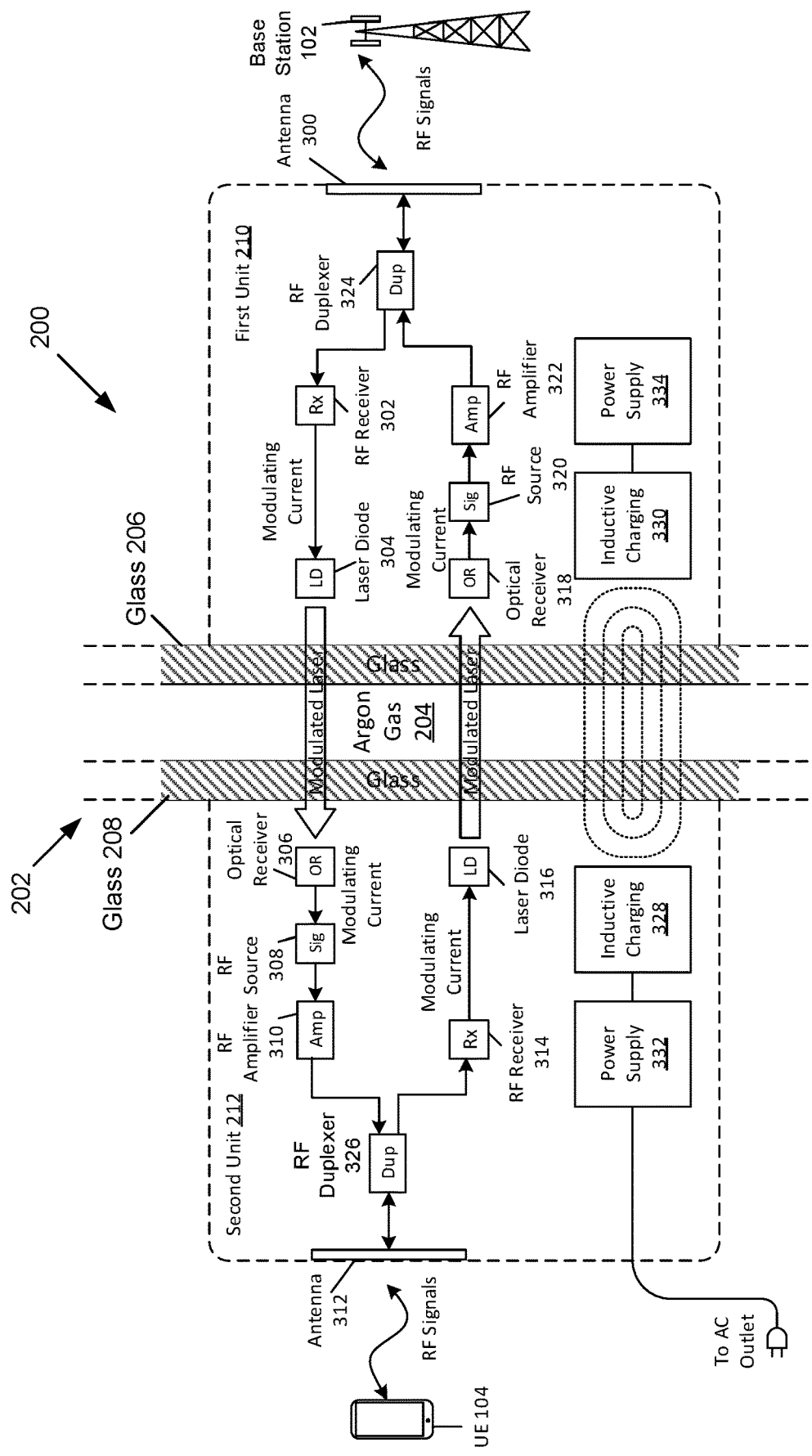

FIG. 3A schematically illustrates a simplex design arrangement of the penetrator device 200. Thus, in FIG. 3A, the first unit 210 includes a first antenna 300a for receiving RF signals from base stations 102 (or access points) at a first frequency and a second antenna 300b for transmitting RF signals to base stations 102 (or access points) at a second frequency. The second unit 212 includes a first antenna 312a for transmitting RF signals to UEs 104 at the first frequency and a second antenna 312b for receiving RF signals from UEs 104 at the second frequency. FIG. 3B schematically illustrates a duplex design arrangement where the first unit 210 includes a RF duplexer 324, and the second unit 212 includes a RF duplexer 326. Thus, the first unit includes a single antenna 300 and the second unit 212 includes a single antenna 312. Flexibility in the design architecture of the penetrator device 200 enables application to time division duplex (TDD) or frequency division duplex (FDD) systems.

Additionally, wireless communication networks often consist of overlays that operate on different frequency bands. In configurations, the penetrator device 200 can incorporate multiple sets of the described electronic components each dedicated to a specific band, or combination of components within the same enclosure to accommodate all bands of interest. Therefore, a multi-band combo package can be assembled, making the penetrator device 200 frequency independent.

With reference to FIGS. 2A and 2B, installation of the penetrator devices 200 may involve peal-and-stick adhesives 214 that allow a general consumer to install a penetrator device 200 on a window without any tools or modifications to windows 202 or walls. As previously noted, an alternative is to use magnets 218 in the indoor and outdoor units 210, 212 to have indoor and outdoor units 210, 212 cling on opposite sides of the window, e.g., to frames or panes around or within the windows 202. Visual alignment of the first unit 210 and the second unit 212 is generally sufficient for transmission and reception of the optical signals as the path across the glass 206, 208 and gas 204 is generally short, making the penetrator device 200 tolerant to alignment errors.

As previously noted, the outdoor unit, e.g., first unit 210, may be outfitted with a gasket 216, e.g., an O-ring, around the periphery to keep out precipitation and dust that can impact the performance of the electronic components therein. If desired, the indoor unit, e.g., second unit 212, may be outfitted with a gasket 216, e.g., an O-ring. around the periphery to keep out moisture and dust that can impact the performance of the electronic components therein.

Since one unit, e.g., the first unit 210, of the penetrator device 200 may operate at the outdoor side of the thermal pane window 202, it may be impractical to require an alternating current (AC) power source within the first unit 210. Thus, in a configuration, the indoor unit, e.g., the second unit 212, of the penetrator device 200 may include an inductive charging mechanism 328 to provide energy to an inductive charging mechanism 330 included within the first unit 210 so that plugging in a power supply 332 of the first unit 210 into an AC power outlet will also provide power to a power supply 334, e.g., a battery, of the first unit 210 to thereby keep both units 210, 212 operating. In a configuration, the power supply 332 of the second unit 212 may comprise a battery that may be charged by connection to an AC power outlet. In a configuration, the first unit 210 may provide the power to the second unit 212 using the inductive charging mechanisms 330, 328. In such a configuration, the power supply 330 may be in the form of a battery or may be plugged into an AC power outlet. Thus, in such a configuration, the power supply 332 may be in the form of a battery.

Figure 4:
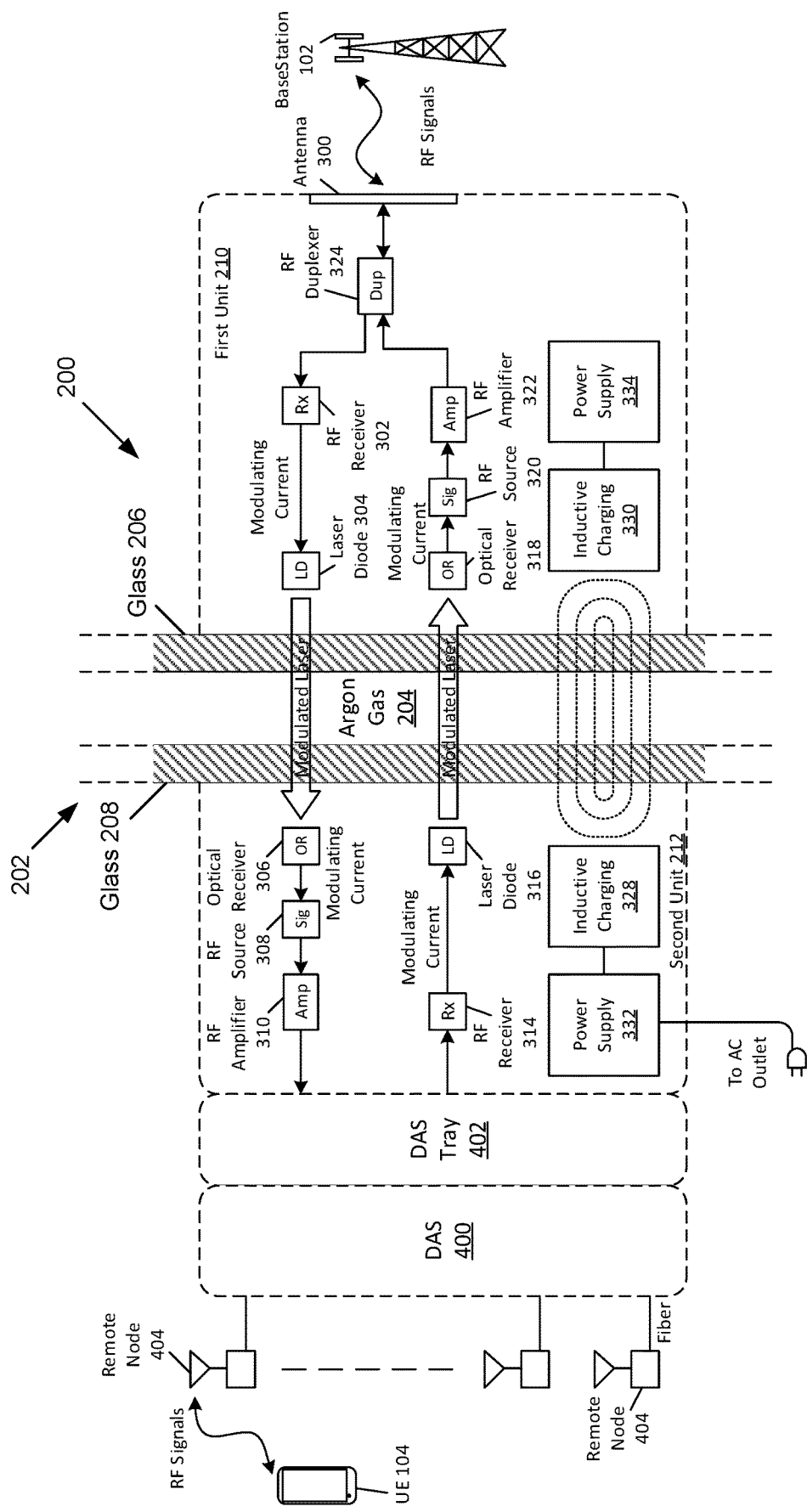
FIG. 4 schematically illustrates the penetrator device of FIGS. 2A, 2B, 3A and 3B used with a distributed antenna system, in accordance with various configurations.

In configurations, structures such as large houses or buildings may require multiple penetrator devices 200 on multiple windows 202 since signals produced internally by the penetrator device 200 may not move within the large structures easily or accurately. In a configuration, as can be seen in FIG. 4, RF signals from the second unit 212 may be provided to a distributed antenna system 400 (DAS) of a structure. The DAS 400 includes a DAS tray 402 that receives the RF signals from the second unit 212 of the penetrator device 200 and then provides the RF signals to the DAS 400, which then broadcasts the RF signals internally in the structure via remote nodes 404 for receipt by UEs 104. The DAS can also receive RF signals from the UEs 104 and then provide the RF signals to the penetrator device 200 for transmission as previously described to the base station 102 (or an access point) of the wireless communication network 100. Such an arrangement can allow for use of only one (or only a few) penetrator device 200 for receiving and transmitting RF signals as previously described within a structure such as a large building.

While methods, techniques, devices and architecture have been described herein with respect to a thermal pane window 202, the methods, techniques, devices and architecture described herein may also be applied for transmission of other vector fields (signal transmissions that utilize amplitude and phase modulation to encode information on transmitted signals) to circumvent other impairment materials/mediums. For example, the methods, techniques, devices and architecture may be used transmitting RF signals through water, plastic, other forms of glass, etc.

Figure 5:
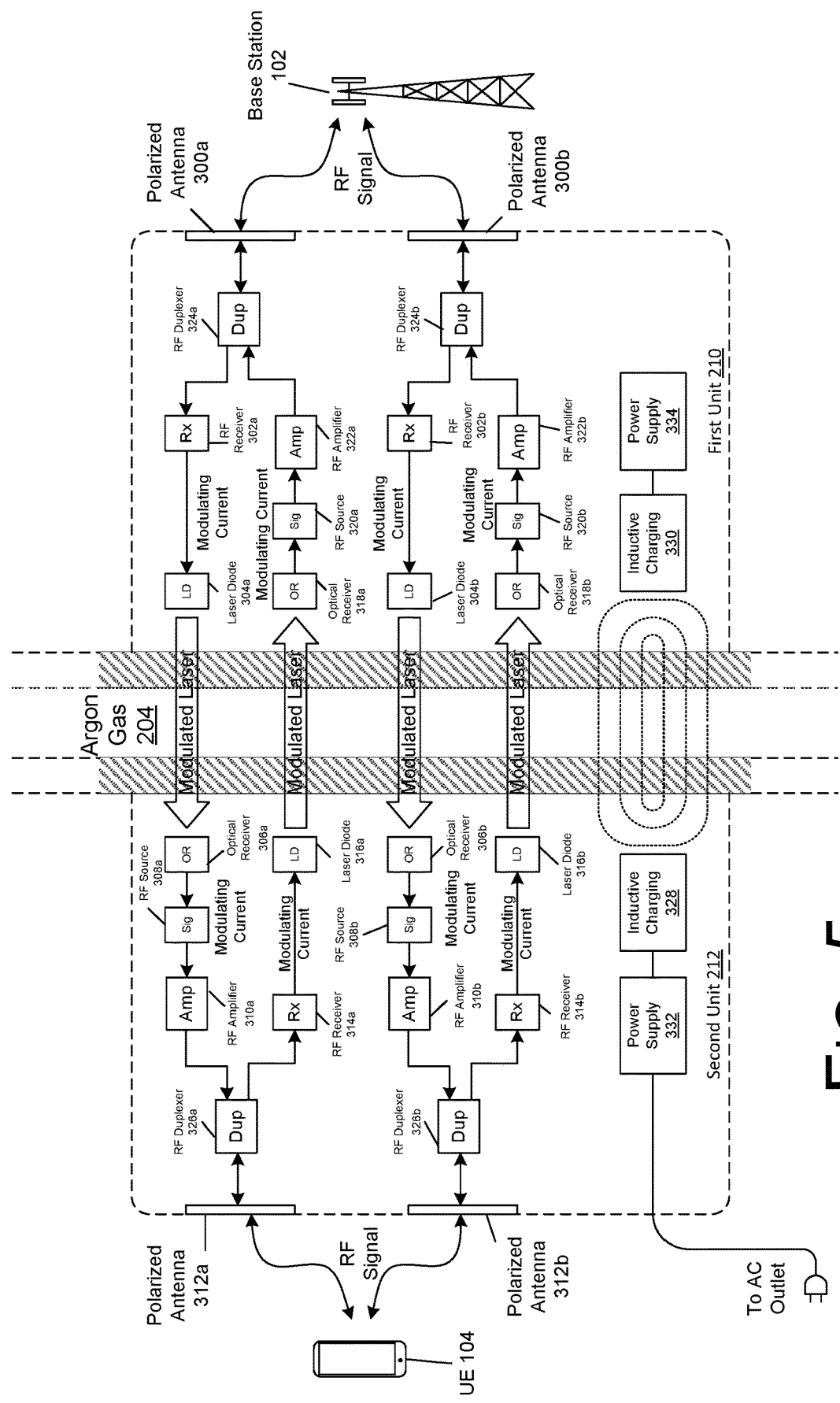
FIG. 5 schematically illustrates the penetrator device of FIGS. 2A, 2B, 3A and 3B used with a Multiple-input Multiple-output (MIMO) arrangement, in accordance with various configurations.

FIG. 5 schematically illustrates an example of a multi-antenna design arrangement, where each of the antennas 300a, 300b, 312a, 312b are optimally designed to discriminate and favor a particular polarization of RF signals. Transmitting each polarized component of RF signals through the penetrator device 200 replicates the MIMO schemes commonly implemented at the antennas of the base stations 102 to reach the UEs 104 and allows radio path diversity. This enables an indoor user to have similar Multiple-input Multiple-output (MIMO) throughput on their UEs 104 as an outdoor user. Accordingly, the first unit 210 includes two or more polarized antennas 300a, 300b. The polarized antennas 300a, 300b are communicatively coupled to corresponding duplexers 324a, 324b, RF receivers 302a, 302b, laser diodes 304a, 304b, optical receivers 318a, 318b, RF sources 320a, 320b and RF amplifiers, 322a, 322b, respectively. Likewise, the second unit 212 includes two or more polarized antennas 312a, 312b. The polarized antennas 312a, 312b are communicatively coupled to corresponding duplexers 326a, 326b, RF receivers 314a, 314b, laser diodes 316a, 316b, optical receivers 306a, 306b, RF sources 308a, 308b and RF amplifiers, 310a, 310b, respectively. The various components along the paths function substantially as previously with respect to FIGS. 3A and 3B, where the RF signals between the base station 102 and the antennas 300a, 300b, as well as the RF signals between the UE 104 and the antennas 312a, 312b, are polarized.

Figure 6:
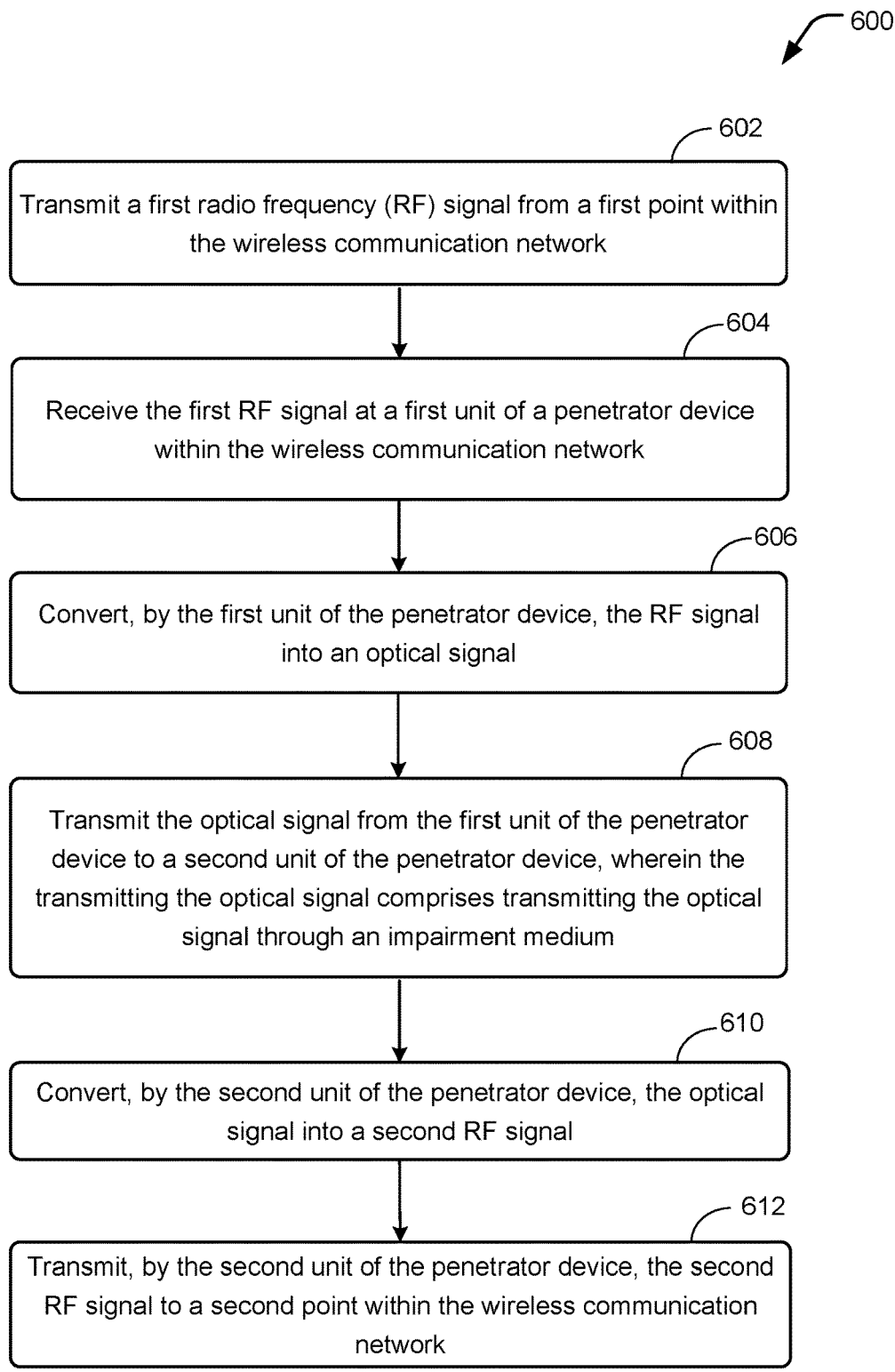
FIG. 6 is a flowchart illustrating a method of propagating wireless signals within the wireless communication network of FIG. 1, in accordance with various configurations.

FIG. 6 is a flow diagram of an illustrative process that may be implemented within the wireless communication network 100. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 6 is a flow diagram illustrating method 500 of propagating wireless signals within a wireless communication network, e.g., wireless communication network 100. As illustrated, at block 602, a first radio frequency (RF) signal is transmitted from a first point, e.g., a base station 102, an access point, a UE 104, etc., within the wireless communication network. At block 604, the first RF signal is received at a first unit of a penetrator device, e.g., penetrator device 200, within the wireless communication network. At block 606, the RF signal is converted, by the first unit of the penetrator device, into an optical signal. At block 608, the optical signal is transmitted from the first unit of the penetrator device to a second unit of the penetrator device, wherein the transmitting the optical signal comprises transmitting the optical signal through an impairment medium. At block 610, the optical signal is converted, by the second unit of the penetrator device, into a second RF signal. At block 612, the second RF signal is transmitted, by the second unit of the penetrator device, to a second point, e.g., a base station 102, an access point, a UE 104, within the wireless communication network.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. An apparatus configured to propagate wireless signals through an impairment medium impairing transmission of radio frequency (RF) signals, the apparatus comprising:
a first unit configured to be coupled to a surface of the impairment medium, comprising:
an antenna configured to wirelessly receive first RF signals containing a data payload;
an RF receiver operatively coupled to the antenna, wherein the RF receiver is configured to convert the data payload from the RF signals into a first modulating current;
an optical source operatively coupled to the RF receiver, wherein the optical source is configured to be modulated with the first modulating current and to transmit first optical signals through the surface of the impairment medium; and
a first optical receiver optically coupled to receive second optical signals through the surface of the impairment medium; and
a second unit configured to be coupled to an opposite surface of the impairment medium, comprising:
a second optical receiver operatively coupled to receive the first optical signals from the optical source through the opposite surface of the impairment medium, wherein the first optical receiver is configured to convert the first optical signals into a second modulating current; and
an RF signal source operatively coupled to the first optical receiver, wherein the RF signal source is configured to modulate second RF signals with the second modulating current and to transmit the second RF signals.

2. The apparatus of claim 1, wherein the first optical receiver is configured to convert the second optical signals into a third modulating current, and wherein the first unit further comprises:
an RF signal source operatively coupled to the first optical receiver, wherein the RF signal source is configured to modulate third RF signals with the third modulating current and to transmit the third RF signals wirelessly via the antenna.

3. The apparatus of claim 1, wherein the first unit further comprises a duplexer operatively coupled between the RF receiver, the RF signal source, and the antenna.

4. The apparatus of claim 3, wherein the antenna comprises multiple polarized antennas configured to replicate Multiple-Input Multiple-Output (MIMO) characteristics for the first RF signals and the second RF signals.

5. The apparatus of claim 1, wherein the impairment medium is a thermal window.

6. The apparatus of claim 1, wherein the antenna comprises a distributed antenna system.

7. The apparatus of claim 1, wherein the first unit further comprises:
a second RF receiver operatively coupled to the antenna for receiving second RF signals containing a second data payload, wherein the second RF receiver is configured to convert the second data payload into a third modulating current; and
a second optical source operatively coupled to the second RF receiver, wherein the second optical source is configured to be modulated with the third modulating current and to transmit third optical signals through the surface of the impairment medium.

8. An apparatus, comprising:
an enclosure configured to be attached to a first surface of an impairment medium substantially impervious to radio frequency (RF) signals;
an antenna system configured to wirelessly receive downstream RF signals and to wirelessly transmit upstream RF signals;
an RF receiver operatively coupled to the antenna system, wherein the RF receiver is configured to convert a downstream data payload from the downstream RF signals into a downstream modulating current;
an optical source operatively coupled to the RF receiver, wherein the optical source is configured to modulate downstream optical signals with the downstream modulating current and to transmit the downstream optical signals through the first surface of the impairment medium;
an optical receiver configured to receive upstream optical signals through the first surface of the impairment medium and convert the upstream optical signals into an upstream modulating current;
an RF signal source operatively coupled to the optical receiver and to the antenna system, wherein the RF signal source is configured to modulate the upstream RF signals with the upstream modulating current and to transmit the upstream RF signals to the antenna system; and
a second RF receiver operatively coupled to the antenna system for receiving second downstream RF signals containing a second downstream data payload.

9. The apparatus of claim 8, wherein the impairment medium is a thermal window comprising argon gas between two panes of glass.

10. The apparatus of claim 8, wherein the antenna system comprises a distributed antenna system and a distributed antenna system tray.

11. The apparatus of claim 8:
wherein the second RF receiver is configured to convert the second downstream data payload into a second downstream modulating current, further comprising:
a second optical source operatively coupled to the second RF receiver, wherein the second optical source is configured to be modulated with the second downstream modulating current and to transmit second downstream optical signals through the first surface of the impairment medium.

12. The apparatus of claim 8, further comprising a duplexer operatively coupled between the RF receiver, the RF signal source, and the antenna system.

13. The apparatus of claim 12, wherein the antenna system comprises multiple polarized antennas configured to replicate Multiple-Input Multiple-Output (MIMO) characteristics for the downstream RF signals and for the upstream RF signals.

14. The apparatus of claim 8, wherein the optical source comprises a laser diode.

15. A method of propagating wireless signals within a wireless communication network through an impairment medium impairing transmission of radio frequency (RF) signals, the method comprising:
receiving downstream RF signals wirelessly via an antenna system;
converting, by an RF receiver, a downstream data payload from the downstream RF signals into a downstream modulating current;

modulating, by an optical source, downstream optical signals with the downstream modulating current;

receiving second downstream RF signals wirelessly via the antenna system;

converting, by a second RF receiver, a second downstream data payload from the second downstream RF signals into a second downstream modulating current;

transmitting the downstream optical signals through a first side of the impairment medium;

receiving, through the first side of the impairment medium, upstream optical signals;

converting, by an optical receiver, the upstream optical signals into an upstream modulating current;

modulating, by an RF signal source, upstream RF signals with the upstream modulating current; and transmitting the upstream RF signals wirelessly via the antenna system.

16. The method of claim 15, further comprising:

modulating, by a second optical source, second downstream optical signals with the second downstream modulating current; and transmitting the second downstream optical signals through the first side of the impairment medium.

17. The method of claim 16, further comprising:

receiving, through the first side of the impairment medium, second upstream optical signals;

converting, by a second optical receiver, the second upstream optical signals into a second upstream modulating current;

modulating, by a second RF signal source, second upstream RF signals with the second upstream modulating current; and transmitting the second upstream RF signals wirelessly via the antenna system.

18. The method of claim 15, further comprising duplexing the downstream RF signals and the upstream RF signals with an RF duplexer between the RF receiver, the RF signal source, and the antenna system.

19. The method of claim 18, wherein the antenna system comprises multiple polarized antennas configured to replicate Multiple-Input Multiple-Output (MIMO) characteristics for the downstream RF signals and for the upstream RF signals.

20. The method of claim 15, further comprising coupling electrical power inductively through the first side of the impairment medium.

* * * * *